C. E. PATRIC.
Grain Drill Tooth Lifter.
No. 3,172. Reissued Oct. 27, 1868.
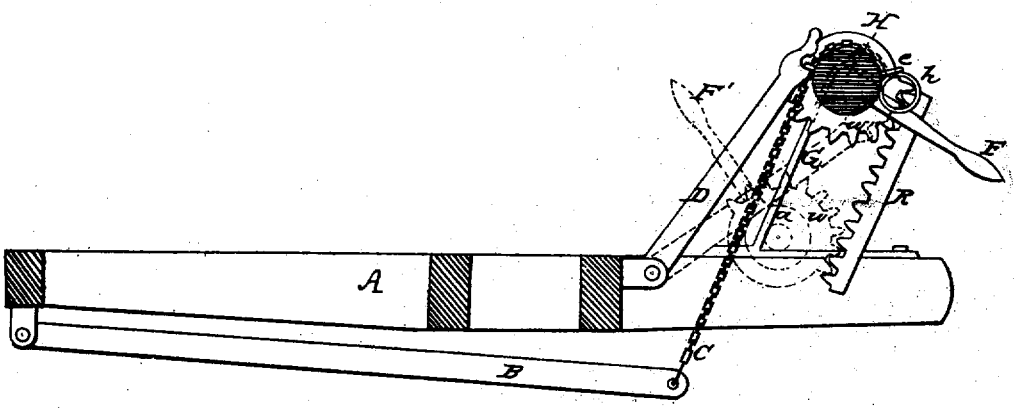
Witnesses
Wm. Loughborough
Fred. Hatch.
Inventor
C. E. Patric
N. PETERS, Photo-Lithographer, Washington, D. C.

UNITED STATES PATENT OFFICE.

C. E. PATRIC, OF MACEDON, NEW YORK.

IMPROVEMENT IN LIFTING APPARATUS FOR GRAIN-DRILLS.

Specification forming part of Letters Patent No. 72,323, dated December 17, 1867; Reissue No. 3,172, dated October 27, 1868.

*To all whom it may concern:*

Be it known that I, CHARLES E. PATRIC, of Macedon, in the county of Wayne and State of New York, have invented a new and useful Lifting Apparatus for Grain-Drill Teeth; and I do hereby declare that the following is a full, clear, and exact description thereof, reference being had to the accompanying drawing, making part of this specification, in which the figure is a vertical section of an ordinary drill-frame with my invention attached, and showing one of the drag-bars B, to which the drill-teeth are attached.

This invention consists in providing an ordinary round or octagonal lifting-shaft of grain-drills with a toothed wheel or segment at each end, which gears into fixed racks.

To enable others to make and use my invention, I will describe its construction and operation.

To the ordinary frame, A, of grain-drills I apply the toothed rack R at each end of the lifting-shaft H. These racks have a guard, G, connected at the top and bottom, so as to encircle the end of the roller or shaft H, as shown at *a*. The guard G, being parallel with the rack, keeps the pinions *w* always in gear with the racks. The locking-latch D is suitably hinged to the frame A of the machine, and the drag-bars B are connected to the teeth and to the frame in the ordinary manner. The chains C are connected with the roller H through an open staple, *c*, or other suitable device, and are provided with a hand-ring, *h*, by means of which any one tooth may be raised at any time by the attendant. The several parts are shown in the elevated position by the full black lines, and the red lines represent the lower or working position.

It will be seen by this arrangement the lifting-shaft H may be made much smaller than with the ordinary construction, because the shaft itself is raised by pulling the lever F, and the lifting-chains C are wound upon the shaft at the same time.

It might be desirable to attach the segmental pinions *w* to a shaft hung in fixed boxes, and the lifting-chains C connected to a cross-rod attached to the racks R, which in that case would be made to rise and fall, they running through suitable guides; or, if desired, the chains may be connected to large rings encircling the shaft H, so as not to wind up at all, but simply rise with the shaft. I prefer an octagonal shaft, and to have the flange of the pinions to correspond in shape, which prevents their turning upon the shaft without being keyed to it. By placing the locking-latch D in the center it acts as a support to prevent the shaft from springing when raised.

It will be seen that the shaft H is caused to rise or fall by being turned on its axis, on account of the axis being movable.

What I claim as my invention, and desire to secure by Letters Patent, is—

1. The employment of the racks R and pinions *w*, in connection with the hand-lever F and shaft H, for the purposes set forth, whether the lifting-chains are made to wind upon the shaft or not.

2. The arrangement of the locking-latch D with the shaft H, when it is also made to act as a support, substantially as and for the purposes set forth.

3. The arrangement of the guards G with the rack R and pinions *w*, substantially in the manner herein shown and described, and for the purposes set forth.

4. The combination of the shaft H with the devices for raising the same, when constructed in such a manner that by turning the shaft on its axis it is caused to rise or fall, for the purpose set forth.

C. E. PATRIC.

Witnesses:
JAS. L. GAGE,
WM. G. LOUGHBOROUGH.